(12) United States Patent
Simonsen et al.

(10) Patent No.: US 10,569,485 B2
(45) Date of Patent: Feb. 25, 2020

(54) FIXING DEVICE FOR FIXATING A SEGMENT OF A WIND TURBINE BLADE TO A MOULD

(71) Applicant: Vestas Wind Systems A/S, Aarhus N. (DK)

(72) Inventors: Claus Svend Simonsen, Haslev (DK); Peter Frans Thomsen, Ringk (DK)

(73) Assignee: Vestas Wind Systems A/S, Aarhus N. (DK)

( * ) Notice: Subject to any disclaimer, the term of this patent is extended or adjusted under 35 U.S.C. 154(b) by 585 days.

(21) Appl. No.: 15/107,690

(22) PCT Filed: Dec. 12, 2014

(86) PCT No.: PCT/DK2014/050430
§ 371 (c)(1),
(2) Date: Jun. 23, 2016

(87) PCT Pub. No.: WO2015/096839
PCT Pub. Date: Jul. 2, 2015

(65) Prior Publication Data
US 2016/0318263 A1  Nov. 3, 2016

(30) Foreign Application Priority Data
Dec. 23, 2013 (DK) .................................. 2013 70818

(51) Int. Cl.
*B29C 70/54* (2006.01)
*B29C 33/22* (2006.01)
(Continued)

(52) U.S. Cl.
CPC ............ *B29C 70/541* (2013.01); *B29C 33/22* (2013.01); *B29K 2105/06* (2013.01); *B29L 2031/085* (2013.01)

(58) Field of Classification Search
CPC ....... B29C 70/541; B29C 33/22; B29C 33/26; B29C 70/30; B29C 70/56; B29C 33/202;
(Continued)

(56) References Cited

U.S. PATENT DOCUMENTS 4,251,065 A * 2/1981 McDougal ................ B25B 1/12
269/204
5,097,716 A * 3/1992 Barbat ................... B23Q 1/267
248/657
(Continued)

FOREIGN PATENT DOCUMENTS

| EP | 1695813 B1 | 6/2007 |
| EP | 2308670 A1 | 4/2011 |
| FR | 2985927 A1 | 7/2013 |

OTHER PUBLICATIONS

International Searching Authority, Search Report and Written Opinion Issued in Corresponding International Application No. PCT/DK2014/050430 dated Mar. 17, 2015.
(Continued)

*Primary Examiner* — Leith S Shafi
(74) *Attorney, Agent, or Firm* — Wood Herron & Evans LLP

(57) ABSTRACT

For fixating a blade segment (1a) of a rotor blade of a wind turbine to a mould (20a), in which the blade segment is manufactured, a fixing device (10) is provided comprising a first portion (11) for selectively applying a clamping force on the fixating extension and a second portion (12) for fixating the fixing device to the mould. In the fixing device (10) one of the first and second portions comprises a cylinder portion (15a) with a threaded structure, and a threaded abutment structure (15b) encircling the cylinder portion and engaging its threaded structure. The respective other portion comprises an aperture (14) and a recess with a second abutment structure (16a) within the aperture. The aperture
(Continued)

(14) is adapted to receive the cylinder portion (15a) such that the cylinder portion (15a) protrudes the aperture (14) along its cylinder axis, and the second abutment structure (16a) is adapted to engage and exert a force on the threaded abutment structure (15b) in a direction parallel to the cylinder axis. One of the first and second portions (11,12) comprises a lateral opening (18) allowing a retaining web (19a) of the respective other portion to abut therein.

16 Claims, 6 Drawing Sheets

(51) Int. Cl.
*B29L 31/08* (2006.01)
*B29K 105/06* (2006.01)

(58) Field of Classification Search
CPC ............... B29K 2105/06; Y02P 70/523; B29L 2031/085; B25B 5/00; B25B 27/00; B25B 1/02; B25B 1/18; B25B 1/103; B25B 5/102; B25B 5/10; B25B 5/106; B25B 5/108; B25B 11/02; B25B 5/08; B23Q 1/262; B23Q 1/44; B23Q 3/00; B23Q 3/06; B23Q 3/065; B23Q 3/069; F16B 5/02; F16B 5/0283; F16B 5/0004; Y10T 74/18728; Y10T 74/18648; Y10T 74/19902; Y10T 74/18576; Y10T 74/18656; Y10T 74/19702
USPC .............. 248/228.3, 229.1–229.26; 74/89.42
See application file for complete search history.

(56) References Cited

U.S. PATENT DOCUMENTS

| | | |
|---|---|---|
| 6,092,797 A | 7/2000 | You |
| 2011/0085911 A1* | 4/2011 | Schroder ............... B29C 33/505 |
| | | 416/223 R |
| 2012/0186374 A1* | 7/2012 | Schroeder ............... F16H 25/20 |
| | | 74/89.32 |

OTHER PUBLICATIONS

Danish Patent and Trademark Office, Search Report Issued in Application No. PA 2013 70818, dated Aug. 8, 2014.

* cited by examiner

FIXING DEVICE FOR FIXATING A SEGMENT OF A WIND TURBINE BLADE TO A MOULD

FIELD OF THE INVENTION

The present invention relates to a fixing device, in particular for fixating a wind turbine blade segment to a mould, a mould with the fixing device for manufacturing a wind turbine blade segment, a method for manufacturing the wind turbine blade segment and a wind turbine with the blade segment.

BACKGROUND OF THE INVENTION

Wind turbine blades are conventionally made of a mould material, such as fibre glass or carbon fibre reinforced plastics. Such wind turbine blades are usually manufactured in halves or in segments of halves. The blade halves or their segments are manufactured by moulding each segment in a respective mould. The two moulded halves of segments are connected to each other by putting them on top of each other while they are still in the respective moulds. For example, one of the moulds may be fixed over the respective other mould. Then, the upper mould is arranged above the other mould with the respective upper segment facing downwards from the upper mould. In this situation, there is a risk that the blade segment disengages from the mould and either gets damaged by falling down or is misaligned with respect to other segment.

To keep the upper segment in the mould, document EP 2 308 670 A1 discloses a fixing device for fixating a segment of a wind turbine blade to a mould, in which the blade segment is manufactured, wherein the blade segment has a fixating portion. The fixing device comprises a first portion for removably fixating the blade segment at its fixating portion to the mould and a second portion for fixating the fixing device to the mould. EP 2 308 670 A1 pertains to various fixing devices configured to press and/or clamp the moulded blade half to the mould such that it is fixed in and/or on the mould.

EP 1 695 813 B1 pertains to the manufacturing of wind turbine blades by using a vacuum inside the mould. Upper and lower blade mould halves are shaped to generate a respective blade production flange terminating in a fixating portion, moulded around fixating edges on the respective mould halves. A blade half may be moulded around a lip-shaped mould edge to help fixate the blade half during a rotation and positioning of an upper mould half on top of a lower mould half.

It is an object of the present invention to provide an improved fixation of the wind turbine blade segment to a mould during manufacturing of the same.

SUMMARY OF THE INVENTION

While the invention is defined in the appended independent claims, further aspects are set forth in the dependent claims, the following description and the drawings.

According to a first aspect, the invention provides a fixing device for fixating a blade segment of a rotor blade of a wind turbine to a mould in which the blade segment is manufactured, wherein the blade segment has a fixating extension, the fixing device comprising a first portion for removably fixating the blade segment at its fixating extension to the mould; and a second portion for fixating the fixing device to the mould. The fixing device comprises at least one of a clamping force structure and a retaining structure. The clamping force structure comprises an aperture and a recess with a second abutment structure within the aperture, the aperture and the recess being arranged in one of the first and second portions, a cylinder portion with a threaded structure and a threaded abutment structure encircling the cylinder portion and engaging its threaded structure, and a third abutment structure arranged in the other one of the first and second portions. The aperture is adapted to receive the cylinder portion such that the cylinder portion protrudes the aperture along its cylinder axis, the second abutment structure is adapted to engage and exert a force on the threaded abutment structure in a direction parallel to the cylinder axis, and the third abutment structure is adapted to receive a force from the cylinder portion in a direction towards the first abutment structure to exert the clamping force. The retaining structure comprises a lateral opening arranged in one of the first and second portions, and a retaining web arranged on the other one of the first and second portions, the retaining web being adapted for insertion into the lateral opening along an insertion direction, wherein the lateral opening is adapted to lock a movement of the retaining web in a direction perpendicular to the insertion direction and to the direction of the clamping force.

According to a second aspect, the invention provides a mould in which at least a segment of a wind turbine blade is manufactured.

According to a third aspect, the invention provides a method for manufacturing a wind turbine blade or a segment of a wind turbine blade in a mould.

According to a fourth aspect, the invention provides using a fixing device according to the first aspect.

According to a fifth aspect, the invention may provide a method for erecting a wind turbine comprising the steps according to the third aspect.

The object is also reached with a fixing device according to appended claim 15.

BRIEF DESCRIPTION OF THE DRAWINGS

Embodiments of the present invention are explained by way of example with respect to the accompanying drawings, in which.

DETAILED DESCRIPTION OF PREFERRED EMBODIMENTS

Figure 1:
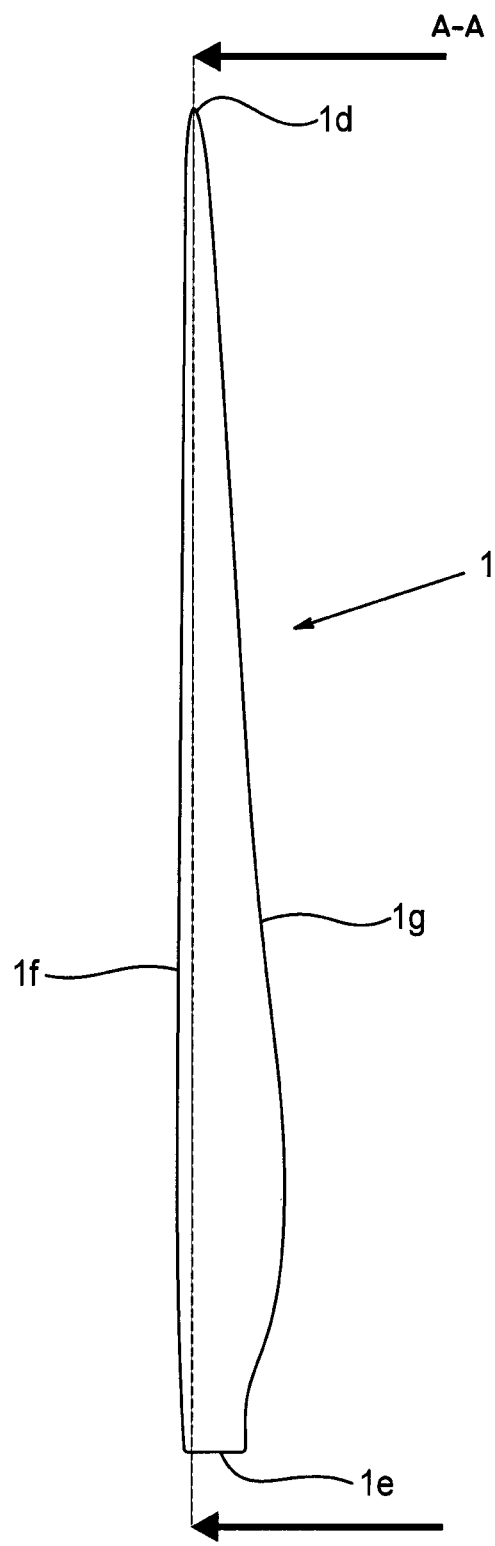
FIG. 1 shows a rotor blade for a wind turbine.

FIG. 1 illustrates a rotor blade 1 of a wind turbine. The rotor blade 1 comprises a blade root 1e adapted for attachment of the rotor blade 1 to a rotor hub of the wind turbine rotor. The rotor blade 1 further comprises a blade tip 1d at the opposite end of the rotor blade 1 with respect to the blade root 1e. The rotor blade 1 also comprises a leading edge 1f on one side of the illustration and a trailing edge 1g on the opposite side, the leading and trailing edges 1f, 1g each running from the blade root 1e to the blade tip 1d. While the leading edge 1f has an almost straight or only slightly bended contour, the trailing edge 1g has a distinctively bended shape with a distinct bulge within the first third of the blade length as seen from the blade root 1e. During operation, the rotor blade 1 will rotate about the rotor hub such that the leading edge 1f faces into the direction of rotation and the trailing edge 1g trails the movement of the rotor blade while the rotor blade tip 1d traces a circumference of the rotor.

Figure 2:
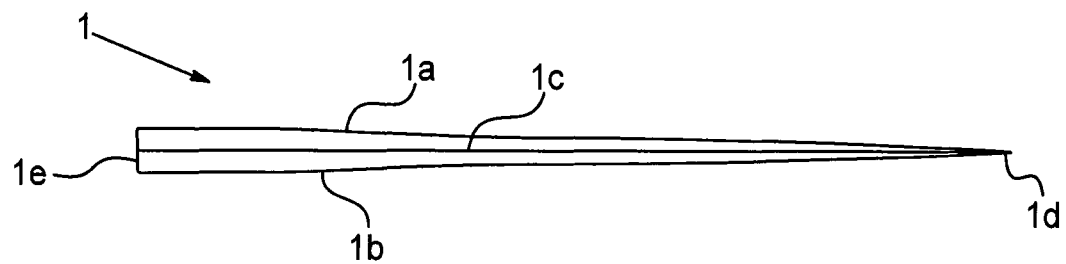
FIG. 2 shows a side view of the rotor blade according to FIG. 1.

FIG. 2 is a view on the trailing edge 1g of the rotor blade 1 according to arrows A-A of FIG. 1. The rotor blade 1 has a roughly wing-like shape with a cross section of the rotor blade having convex outlines between the trailing edge 1g and the leading edge 1f of the rotor blade 1. Also, while the blade tip 1d is relatively thin, the blade root 1e has a polygonal or circular shape and the outlines of the rotor blade 1 extend mostly straight or convex there between. Thus, the rotor blade 1 contains a volume. To receive such volume, the rotor blade 1 is comprised of blade halves 1a, 1b usually separated along the trailing edge 1g and the leading edge 1f. Thus, each blade half has at least a part of the trailing and the leading edges 1f, 1g of the rotor blade 1. In particularly long blades, such as 50 metres or more, it is known to manufacture the blade in segments, i.e., the blade (or blade half) is divided into smaller blade segments along the longitudinal and/or width direction of the blade. The blade halves 1a, 1b or segments are moulded from a mould material such as plastics reinforced with fibre glass or carbon fibre in a mould. During the moulding process, the mould material lines the mould and the mould surface determines the outer surface of the blade half 1a, 1b or segment.

In the embodiment of FIG. 2, the rotor blade 1 is comprised of an upper blade half 1a and a lower blade half 1b. In further embodiments the upper and lower blade halves 1a, 1b are further separated into segments. The upper and lower blade halves 1a, 1b are attached to each other at a connection surface 1c running from the blade root 1e along the leading edge 1f to the blade tip 1d and via the trailing edge 1g back to the blade root 1e.

The terms upper blade half and a lower blade half refer to blade halves of the rotor blade previous to installation and during assembly of the rotor blade 1, when the upper blade half 1a is arranged on top of the lower blade half 1b for attachment thereto.

Before proceeding further with the detailed description of the embodiments of the invention, some general aspects of the invention are discussed. A fixing device for fixating a blade segment of a rotor blade of a wind turbine to a mould in which the blade segment is manufactured, wherein the blade segment has a fixating extension, comprises a first portion comprising a first abutment structure to selectively exert a clamping force on the fixating extension of the blade segment and a second portion for fixating the fixing device to the mould. The fixing device comprises at least one of a clamping force structure and a retaining structure. The clamping force structure comprises an aperture and a recess with a second abutment structure within the aperture, the aperture and the recess being arranged in one of the first and second portions, a cylinder portion with a threaded structure and a threaded abutment structure encircling the cylinder portion and engaging its threaded structure, and a third abutment structure arranged in the other one of the first and second portions. The aperture is adapted to receive the cylinder portion such that the cylinder portion protrudes the aperture along its cylinder axis, the second abutment structure is adapted to engage and exert a force on the threaded abutment structure in a direction parallel to the cylinder axis, and the third abutment structure is adapted to receive a force from the cylinder portion in a direction towards the first abutment structure to exert the clamping force. The retaining structure comprises a lateral opening arranged in one of the first and second portions, and a retaining web arranged on the other one of the first and second portions, the retaining web being adapted for insertion into the lateral opening along an insertion direction, wherein the lateral opening is adapted to lock a movement of the retaining web in a direction perpendicular to the insertion direction and to the direction of the clamping force.

In some embodiments, the lateral opening extends from the aperture and allows the cylinder portion shifting into the aperture in a direction perpendicular to the cylinder axis.

In some embodiments the retaining web extends in parallel to the cylinder axis.

In some embodiments, the first portion comprises a first abutment structure to exert the clamping force on the fixating extension of the blade segment, the first abutment structure being aligned to the cylinder axis of the cylinder portion.

In some embodiments, the one of the first and second portions comprising the cylinder portion further comprises a bracket having first and second terminals, the bracket holding the cylinder portion between the first and the second terminals, with the first and second terminals comprising the third abutment structure, such that the first and the second terminals are aligned to the cylinder axis, and connecting the cylinder portion to the one of the first and second portions.

In some embodiments, the retaining web extends between the first and second terminals, the retaining web being rigidly connected to the bracket and to the one of the first and second portions.

In some embodiments, the cylinder portion comprises a driving terminal, the driving terminal protruding one of the first and second terminals to rotationally adjust the cylinder portion.

In some embodiments, the first portion may comprise a handle attachment. In particular, the first portion (11) may comprise a handle attachment (11a).

In some embodiments, the cylinder portion is received permanently in one of the first and second portions.

A mould for manufacturing a blade segment of a rotor blade for a wind turbine, the blade segment having a fixating extension, comprises a hollow for forming the blade segment, a rim at an edge of the hollow, a flange extending perpendicularly from the rim and away from the hollow; and a fixing device according to any of the previous embodiments disposed on the flange, such that the first portion of the fixing device is arranged to selectively apply a clamping force against the rim and thereby clamping the fixating extension between the first portion and the rim.

A method for manufacturing a rotor blade for a wind turbine in a mould, the rotor blade being comprised of first and second blade segments having a fixating extension, comprises providing the first blade segment in the hollow of a mould according to the previous embodiment, such that the hollow faces upwards and the fixating portion overlies the rim, providing the first portion of the fixing device and clamping the fixating extension between the first portion and the rim of the mould, and providing the second blade segment in the hollow of a further mould, such that the hollow faces upwards. The method further comprises turning the mould such that the hollow with the first blade segment faces the second blade segment in the hollow of the further mould, arranging the first blade segment on the second blade segment, and unclamping the fixating extension between the first portion and the rim.

In some embodiments, clamping the fixating extension between the first portion and the rim comprises exerting a clamping force on the fixating extension towards the rim via a first abutment structure of the first portion.

In some embodiments, the clamping force is generated by rotating the cylinder portion such that the threaded abutment structure travels away from the rim and abuts against the second abutment structure within the recess.

In some embodiments, providing the first portion of the fixing device comprises shifting the cylinder portion through the lateral opening into the aperture of the second portion in a direction perpendicular to the cylinder axis, such that the threaded abutment structure is received in the recess portion.

During erecting a wind turbine a rotor blade is manufactured according to at least one of the previous embodiments.

Figure 3:
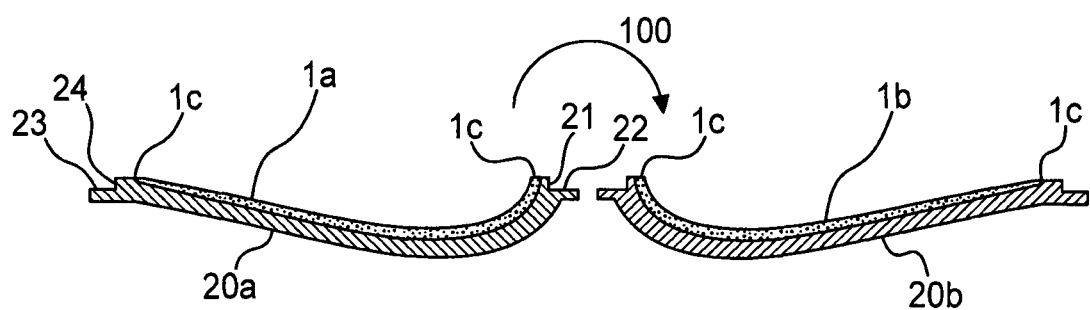
FIG. 3 shows a sectional view of a mould containing halves of blade segments.

FIG. 3 shows upper and lower moulds 20a, 20b for producing the blade halves 1a, 1b of the rotor blade 1. The upper and lower blade halves 1a, 1b are manufactured by moulding each of the upper and lower blade halves 1a, 1b in the upper and lower mould 20a, 20b, respectively. The upper and lower moulds 20a, 20b each comprise a respective hollow to receive the material for the blade halves 1a, 1b and to form and define the respective shape of the upper and lower blade halves 1a, 1b. For example, fibre material is filled and/or laminated together with a polymer into the hollow of the mould 20a, 20b. Then, the material in the mould is cured. Once the upper and lower blade halves 1a, 1b are cured, the upper blade half 1a is positioned on top of the lower blade half 1b for attachment of the upper and lower blade halves 1a, 1b to each other. To this end, the upper mould 20a, which still contains the upper blade half 1a, is rotated and disposed on top of the lower blade half 1b which is still in the corresponding mould 20b, according to arrow 100. In some embodiments, there is a hinge between the upper and lower moulds 20a, 20b to guide the rotation (not shown). Thus, during rotation and before the upper blade half 1a is arranged on the lower blade half 1b, there is a risk that the upper blade half 1a falls out of the upper mould 20a or that the upper blade half 1a is at least displaced during the rotation and before the upper blade half 1a is securely arranged on the lower blade half 1b.

In the embodiment shown in FIG. 3, the moulds 20a, 20b of the upper and lower blade halves 1a, 1b, respectively, are provided with a first rim 21 at an edge of the hollow along the connection 1c at the leading edge 1f and a second rim 24 at an edge of the hollow along the connection 1c at the trailing edge 1g. During the moulding of the blade, an extension of the upper blade half 1a is arranged to overlie the first rim 21 at the leading edge 1f and the second rim 24 at the trailing edge 1g. The first and second rims 21, 24 form a surface facing away from the hollow of the mould 20a. In some embodiments, the first and second rims 21, 24 border each other adjacent to a section of the upper mould 20a for the blade tip 1d. The upper mould 20a further comprises a first flange 22 adjacent to the first rim 21 at the leading edge of the rotor blade 1, with the first flange 22 extending away from the first rim 21 and from the hollow of the upper mould 20a. In some embodiments the first flange 22 extends perpendicularly to the first rim 21. The upper mould 20a further comprises a second flange 23 extending away from the second rim 24 and from the hollow of the upper mould 20a. In some embodiments the second flange 23 extends perpendicularly to the second rim 24. In further embodiments first and second rims 21, 24 are inclined towards the first and second flanges 22, 23, respectively, such that the first and second rims 21, 24 and the first and second flanges 22, 23, respectively, form an acute angle. In some embodiments the first and second flanges 22 and 23 are coplanar with respect to each other. The first and second flanges 22, 23 are adapted to receive a fixing device as introduced further below, the fixing device fixing the upper blade half 1a to the upper mould 20a. To this end, the fixing device is attached to the first and second flanges 22, 23 and presses the extension of the upper blade half 1a against the first and second rims 21, 24.

Figure 4A:
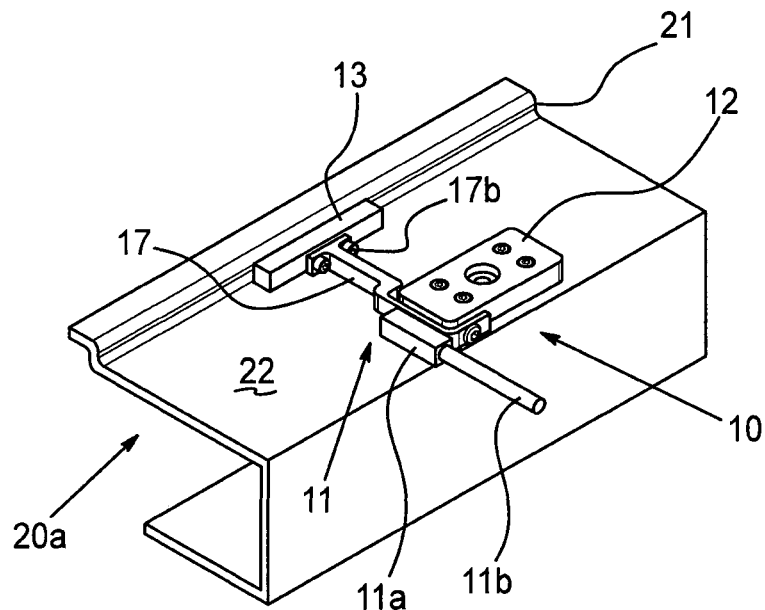
FIG. 4A shows a perspective view of a detail of a mould flange with an embodiment of a fixing device according to the invention.

FIG. 4A shows a perspective view of the first flange 22 and the first rim 21 with an inventive fixing device 10. The fixing device 10 comprises a first portion 11 for clamping the extension of the blade half 1a against the first rim 21 of the mould 20a. The fixing device 10 further comprises a second portion 12 for rigidly attaching the fixing device 10 to the first flange 22 of the mould 20a.

Particularly, the first portion 11 comprises a first abutment structure 13 adapted to exert a clamping force on the extension of the blade half such that the extension of the blade half is clamped between the first abutment structure 13 and the first rim 21. The second portion 12 is adapted to support the first portion 11 when exerting the clamping force on the extension of the blade half.

As explained further below in more detail, the first portion 11 is held in place by clamping between the second portion 12 and the first rim 21. If the clamping force is released, the first portion 11 may be removed from the second portion 12 and the first flange 22. In some embodiments the first portion 11 comprises a handle attachment 11a to attach a handle 11b for removing the first portion 11 by hand. In further embodiments the handle attachment is adapted to be engaged by a placement and removing device (not shown).

The first portion 11 further comprises a shaft 17 to transfer the exerted force from the second portion 12 to the first abutment structure 13. The shaft 17 further comprises attachment members 17b to releasably attach the abutment structure 13 to the shaft 17. In some embodiments, the attachment members 17b are screws and are adapted to be released by unscrewing. This way, the first abutment structure 13 may be exchanged to adapt to a different shape of the first rim 21 or to provide variable abutment surfaces to adapt to different fibre reinforced polymers.

Figure 4B:
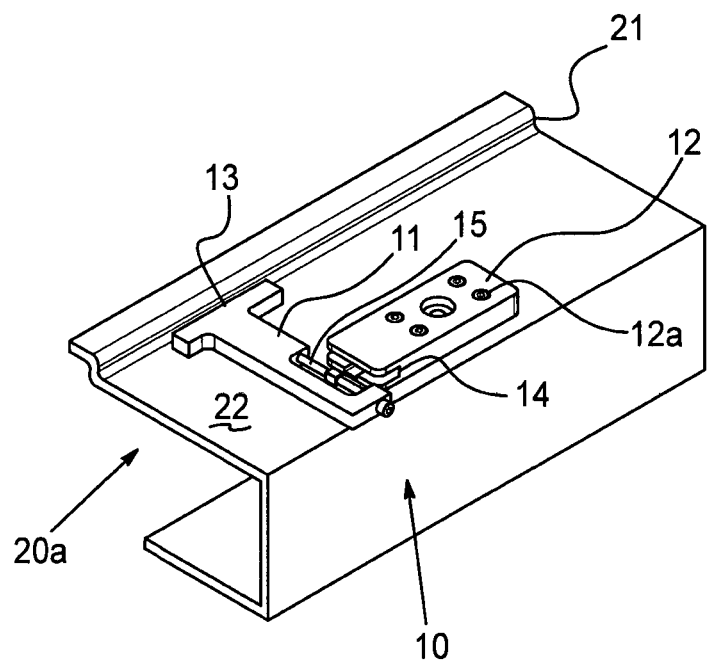
FIG. 4B shows a perspective view of a detail of the mould flange of FIG. 4A with another embodiment of a fixing device according to the invention, wherein a first portion of the fixing device is detached from a second portion of the fixing device.

FIG. 4B shows the fixing device 10 with the first portion 11 detached from the second portion 12. Since the first portion is disengaged from the second portion 12 a clamping drive 15 of the first portion 11 is visible. Also, since the clamping drive 15 of the first portion 11 is disengaged, an aperture 14 is visible in the second portion 12. After disengagement, the aperture 14 in the second portion 12 faces the clamping drive 15 in the first portion 11. Likewise, immediately before engaging the clamping drive 15 of the first portion 11 and the aperture 14 of the second portion 12, the clamping drive 15 and the aperture 14 face each other. When the clamping drive 15 of the first portion does not engage the aperture 14 of the second portion 12, the first abutment structure 13 of the first portion 11 exerts no force on the first rim 21 and the extension of the upper blade half 1a may be disposed at or removed from the first rim 21.

While the second portion 12 is attached stationary to the first flange 22, the disengaged first portion 11 can be removed by the placement and removing device or by hand.

In the embodiment shown in FIG. 4B the first abutment structure 13 is formed integrally with the first portion 11. This allows simplifying manufacturing of the first portion 11 since no accommodation for attachment members must be provided. Such configuration is particularly suitable if characteristics of the first abutment structure 13 suit a large number of rotor blade materials and/or shapes as well as materials and/or shapes of the first rim 21.

The second portion 12 of the fixing device 10 further comprises at least one attachment member 12a, such as at least one screw, for attaching the second portion 12 stationary to the first flange 22.

Figure 5A:
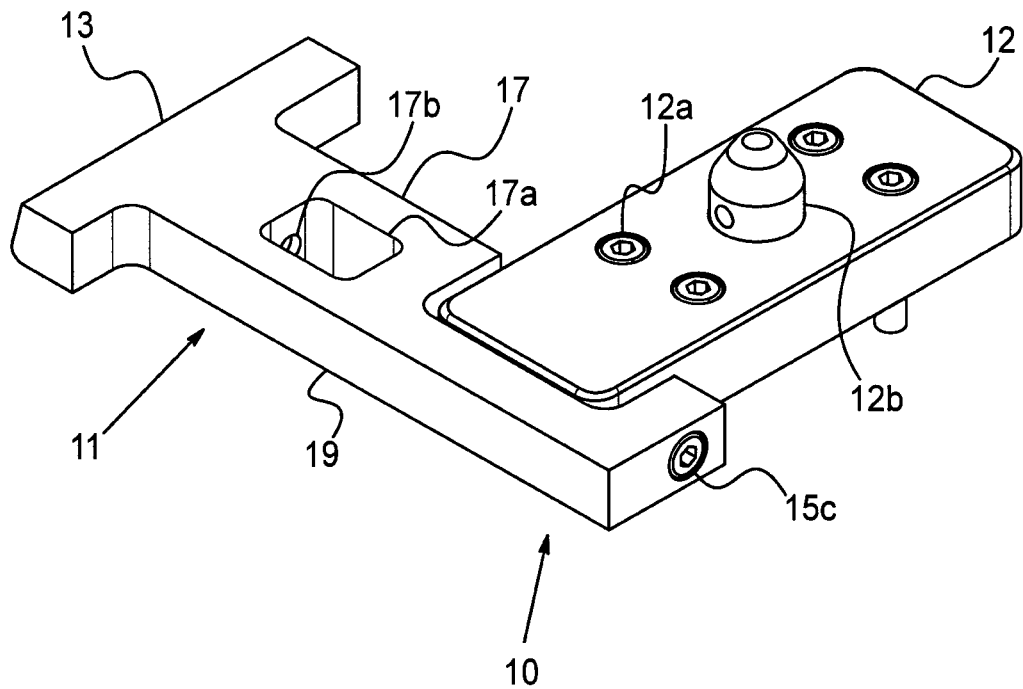
FIG. 5A shows a perspective view of an embodiment of a fixing device according to the invention.

FIG. 5A shows the fixing device 10 similar to the fixing device 10 of FIGS. 4A and 4B in more detail. As indicated above, the fixing device 10 comprises the first portion 11 and the second portion 12. The first portion 11 comprises a bracket 19 holding the clamping drive 15 in a recess as explained further below.

In the embodiment shown in FIG. 5A, the first portion 11 comprises an access aperture 17a in the shaft 17 between the first abutment structure 13 and the bracket 19. The access aperture 17a is adapted to dispose an attachment member 17b for attachment of the first abutment structure 13 to the shaft 17. In various embodiments, the access aperture 17a is arranged on a side of the shaft 17 or centrally with portions of the shaft 17 connecting the bracket 19 and the first abutment structure 13 on two sides of the access aperture.

A section of the second portion 12 containing the aperture 14 fits snugly into the recess of the bracket 19, however, allows certain movement of the first portion 11 with respect to the second portion 12 in the direction of the clamping force, when the aperture section of the second portion 12 engages the clamping drive 15 in the recess of the bracket 19. As shown in FIG. 5A, a driving terminal 15c of the clamping drive 15 protrudes a side of the first portion 11 facing away from the first abutment structure 13. The driving terminal 15c is accessible while the rest of the clamping drive 15 is arranged in the aperture 14 and is used to rotationally adjust the cylinder portion 15a of the clamping drive 15 and thereby the clamping force of the clamping drive.

As further shown in FIG. 5A, the second portion 12 comprises an alignment spigot 12b adapted to align the upper mould 20a on the lower mould 20b when closing the moulds 20a, 20b. To this end, the respective other mould has a hole that goes together with the alignment spigot 12b. In further embodiments, the second portion may instead have a measurement member to indicate alignment, proximity, a pressure of the first mould 20a on the second mould 20b or any other parameter indicative of a relation of the upper mould 20a and the lower mould 20b to each other.

Figure 5B:
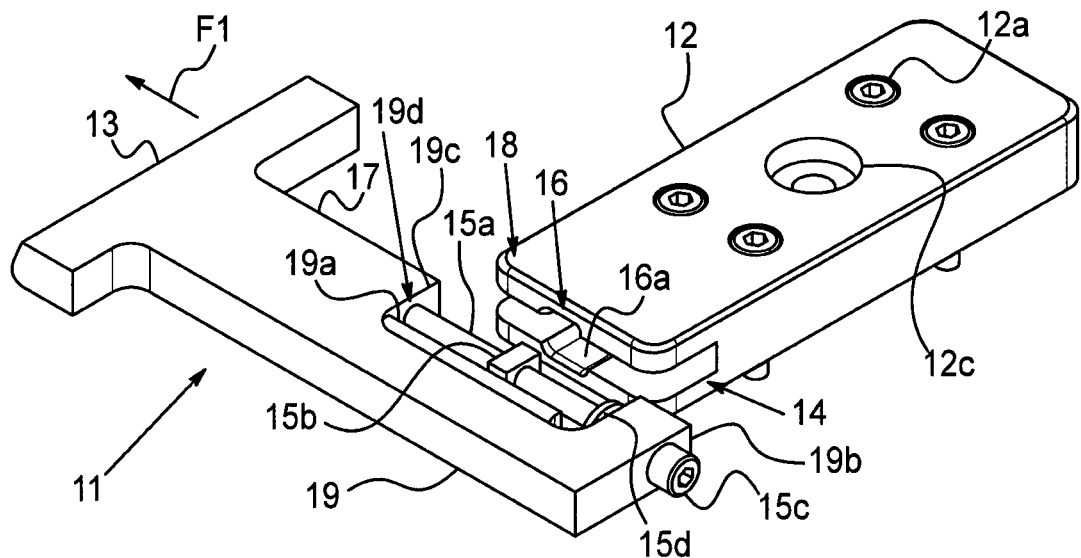
FIG. 5B shows a perspective view of an embodiment of a fixing device according to the invention, wherein a first portion of the fixing device is detached from a second portion of the fixing device.

FIG. 5B shows the fixing device 10 of FIG. 4B in more detail. As indicated before, in this embodiment, the first abutment structure 13 is formed integrally with the first portion 11, such that the first abutment structure 13, the shaft 17 and the bracket 19 form an integral structure. In various embodiments, the bracket 19 has a first terminal 19b and a second terminal 19c holding the clamping drive 15 there between. At least one of the first and second terminals 19b, 19c comprises a third abutment structure receiving the adjusted clamping force from the clamping drive 15. In further embodiments the abutment structure 13, the shaft 17 and the clamping drive 15 are aligned to each other. Further, the first abutment structure 13 and the shaft 17 are adapted to be aligned to a clamping force which is generated by the clamping drive 15. The bracket 19 holds the clamping drive 15 in position and thereby orients the clamping force, particularly by the position of the first and second terminals 19b, 19c with respect to each other, which position determines roughly the direction of the clamping force F1. In various embodiments, the first and second terminals 19b, 19c are arranged such that the second terminal 19c is arranged between the first terminal 19b and the first abutment structure 13.

The clamping drive 15 comprises a cylinder portion 15a and a threaded abutment structure 15b such as a nut. This cylinder portion 15a has a threaded structure at its circumference and the threaded abutment structure 15b has an inner threading engaging the threaded structure of the cylinder portion 15a. Accordingly, by rotation of the cylinder portion 15a the threaded abutment structure 15b can move along the cylinder portion or can be forced in a direction along the cylinder portion 15a. The third abutment structure is adapted to lock the cylinder portion 15a against displacement towards the first abutment structure 13. Thereby the third abutment structure is adapted to receive the adjusted clamping force. In various embodiments, the third abutment structure is formed in at least one of the first and second terminals 19b, 19c as a surface against which the cylinder portion 15a abuts along its cylinder axis. For example, the second terminal 19c forms an abutting surface as the third abutment structure and a tip portion of the cylinder portion 15a is adapted to press against the abutting surface. In the depicted embodiment, the abutting surface is formed at the bottom of a blind hole 19d in the second terminal 19c to receive the tip portion and to stabilise the tip portion on the abutting surface, wherein the side walls of the blind hole prevent the tip portion from a sideways displacement. In a further example, the cylinder portion 15a has a constriction and the first terminal 19b is formed to engage the constriction. In a further example, the first terminal 19b receives the cylinder portion 15a in a hole with a similar diameter as the cylinder portion 15a. In this example, the clamping drive 15 comprises a screw head with a larger diameter than the cylinder portion 15a. In the embodiment of FIG. 5B, the screw head is arranged together with the driving terminal 15c. The clamping drive 15 is adapted to abut with the screw head on the edge of the hole in the first terminal 19b, such that the edge of the hole forms the third abutment structure.

The clamping drive 15 comprises the driving terminal 15c for rotating the cylinder portion 15a. The driving terminal 15c has an engagement structure for a screw driver or any device adapted to drive the cylinder portion rotationally in order to shift the threaded abutment structure 15b along the cylinder portion and/or to force the threaded abutment structure 15b along the cylinder portion and thus, generate the clamping force F1. The clamping drive 15 further comprises a fastening retainer such as a retaining ring or a circlip 15d to keep the cylinder portion between first and second bracket terminals 19b, 19c.

The second portion 12 comprises an aperture 14, which is adapted to receive the clamping drive 15 such that the clamping drive 15 protrudes the aperture 14.

The aperture 14 is arranged at one side of the second portion 12. The second portion 12 is arranged on the first flange 22 of the upper mould 20a such that the aperture 14 extends through the second portion 12 towards the first rim 21 of the first mould 20a. The aperture 14 has a lateral opening 18 such that the aperture 14 has a U-shaped cross sectional profile with two flanks opposing each other and opens to the one side of the second portion 12. The aperture 14 is adapted to receive the cylinder portion 15a of the clamping drive 15 through the lateral opening such that the cylinder portion does not need to be shifted through the aperture along its length.

The aperture 14 further comprises a recess portion 16 such that in a section of the aperture a distance between its flanks is increased. At the transitional portion between the recess 16 and the remainder of the aperture 14 a second abutment structure 16a is provided, adapted to abut the threaded abutment structure 15b of the clamping drive 15 in a direction towards the first rim 21 of the mould 20a. Thereto the second abutment structure 16a faces in the direction of the first rim 21. The aperture 14 is dimensioned to receive the cylinder portion 15a of the clamping drive 15 and the recess 16 is adapted to receive the threaded abutment structure 15b. The threaded abutment structure 15b has an outer diameter which is larger than the distance between the flanks of the remainder of the aperture 14 and therefore does not fit into the remainder of the aperture 14 at least when the threaded abutment structure 15b engages the threaded structure of the cylinder portion 15a. The recess 16 also extends through the lateral opening 18 such that the threaded abutment structure can be pushed through the recess 16 of the lateral opening 18.

When the cylinder portion 15a with the threaded abutment structure 15b is received in the aperture 14, the threaded abutment structure 15b is received in the recess 16. When the cylinder portion is rotated, the threaded abutment structure will come into abutment against the second abutment structure 16a of the aperture 14. By abutting the threaded abutment structure 15b against the second abutment structure 16a, the cylinder portion 15a is forced towards the first rim 21 and the first portion 11 with it. In this way the first portion 11 with the first abutment structure 13 clamps the extension of the upper blade half 1a against the first rim 21. Hence, the upper blade half 1a is secured to the upper mould 20a.

The bracket 19 further comprises a retaining web 19a extending between the first and second terminals 19b, 19c of the bracket 19. The retaining web 19a fits snugly into the lateral opening 18 of the aperture 14 of the second portion 12. The retaining web 19a is adapted to take up forces perpendicular to a direction of the clamping force F1, particularly in a normal direction from the first flange 22.

In further embodiments the lateral opening and the aperture are separated by a wall (not shown). In some of these embodiments the cylinder portion and the retaining web are arranged permanently in the aperture and the lateral opening. In some of these embodiments there is no bracket and the cylinder portion and the retaining web extend in parallel from the shaft, such that the cylinder portion and the retaining web can be inserted into the aperture and the lateral opening, respectively, from the side of the aperture facing the rim.

In the embodiment shown in FIG. 5B, the second portion 12 further comprises a receptacle 12c for receiving the spigot 12b or a corresponding structure at the flange of the opposing lower mould 20b.

Figure 6A:
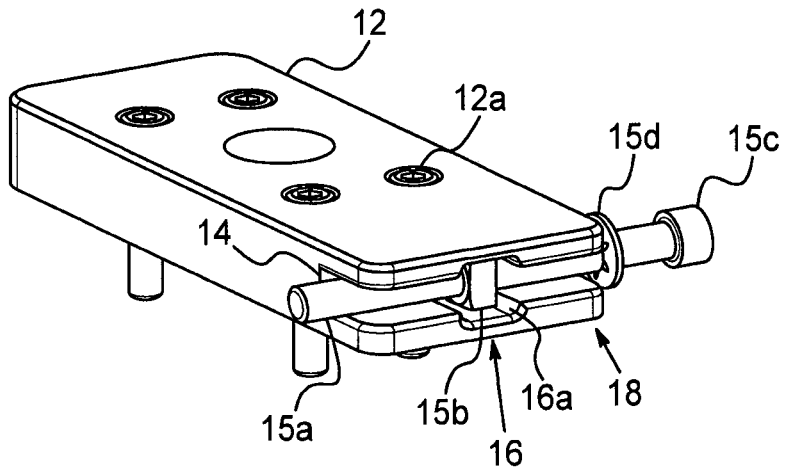
FIG. 6A shows a perspective view of the second portion of the fixing device with a cylinder portion and a nut of the first portion of the fixing device.

FIG. 6A shows the clamping drive 15 received in the aperture 14 of the second portion 12. While the second portion 12 is attached to the first flange 22 by the attachment member 12a, the clamping drive is shifted into the aperture 14 perpendicularly to the cylinder axis of the cylinder portion 15a. At the same time, the cylinder portion 15a reaches through the threaded abutment structure 15b and the threaded structure of the cylinder portion 15a engages the threading of the threaded abutment structure 15b. As shown in the embodiment of FIG. 6A, the aperture 14 has a U-shaped cross section with flanks at both sides. The recess 16 is formed by recess portions at locations on the inner surfaces of the flanks facing each other. The recess portions reach through the lateral opening 18 of the aperture such that the threaded abutment structure 15b can be pushed through the lateral opening 18 into the recess 16 and can be pulled out again in the reverse direction. The second abutment structure 16a is arranged at the transition from the recess portions to the remainder of the flanks of the aperture 14. When the second portion 12 is attached to the first flange 22, the second abutment structure 16a faces the first rim 21 of the mould 20a and abuts the clamping drive to exert a force towards the first rim 21.

To move the threaded abutment structure 15b along the cylinder portion 15a, the driving terminal 15c is adapted to receive a corresponding rotational device or tool (not shown), such as a screw driver, and is adapted to rotate according to the action of the corresponding tool. The cylinder portion 15a rotates together with the rotation of the driving terminal 15c.

In the embodiments depicted in FIGS. 5A and 5B the driving terminal 15c has a female hexagonal socket head to receive the rotational device. FIG. 6A further shows the fastening retainer 15d which is arranged on the cylinder portion 15a to prevent the cylinder portion 15a from slipping out of the bracket 19 (not shown in FIG. 6A).

Figure 6B:
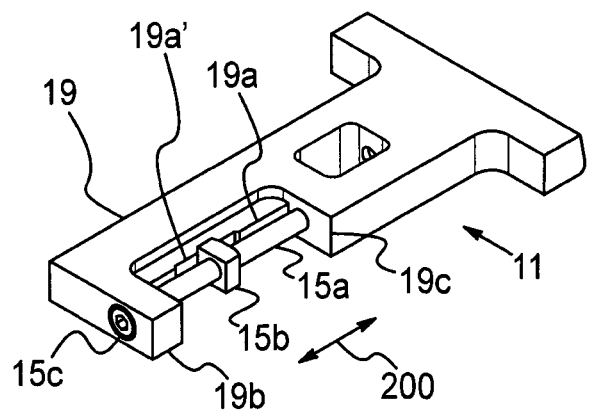
FIG. 6B shows a perspective view of the first portion of the fixing device.

FIG. 6B shows the first portion 11. In the embodiment in FIG. 6B, the retaining web 19a within the bracket 19 extends between first and second terminals 19b, 19c of the bracket 19 and in parallel to the cylinder portion 15a of the clamp drive. The retaining web will effectively take up bending moments caused by forces in the direction transversal to the clamping force such that the clamp drive 15 and its cylinder portion 15a do not have to take up such forces. Such forces may be particularly due to a gravity force when the upper mould 20a is turned on top of the lower mould 20b is will have a component in a normal direction of a surface of the first flange 22.

As can be seen in FIG. 6B, by rotating the driving terminal 15c the cylinder portion 15a rotates accordingly and due to the threaded structure of the cylinder portion and the inner threading of the threaded abutment structure 15b, the threaded abutment structure travels along the cylinder portion 15a according to arrow 200.

As shown in the embodiment of FIG. 6B, the retaining web 19a has a shallow recess 19a' allowing free travel of the threaded abutment structure along the retaining web 19a without obstructing its way of travel. Apart from that, the retaining web 19a in the depicted embodiment reaches closely to the cylinder portion 15a and thereby provides a large abutment surface for the flank of the aperture 14 in the area of the lateral opening 18, i.e. for the flank of the lateral opening 18. When the upper mould 20a is oriented with the first flange 22 facing downwards, the retaining web 19a takes up a force of gravity on the first portion 11. Thus, in operation the retaining web 19a either abuts against one flank of the lateral opening 18 or cants between both flanks of the lateral opening 18.

In further embodiments the retaining web is arranged at the second portion at the position of the lateral opening. In these embodiments the lateral opening is arranged on the first portion.

The clamping drive 15 in above embodiments has been shown and explained to be arranged on the first portion 11, which is the portion removable for allowing disposal and removal of the upper blade half 1a and the blade 1, respectively, to and from the mould 20a, 20b.

In further embodiments the clamping drive 15 together with the cylinder portion 15a, the threaded abutment structure 15b, the driving terminal 15c and the fastening retainer 15d is arranged in the second portion, which is the stationary portion fixed to the first flange 22 of the upper mould 20a. In such embodiments the aperture 14 providing the second abutment structure 16a and the recess 16 is arranged on the removable first portion.

Figure 7:
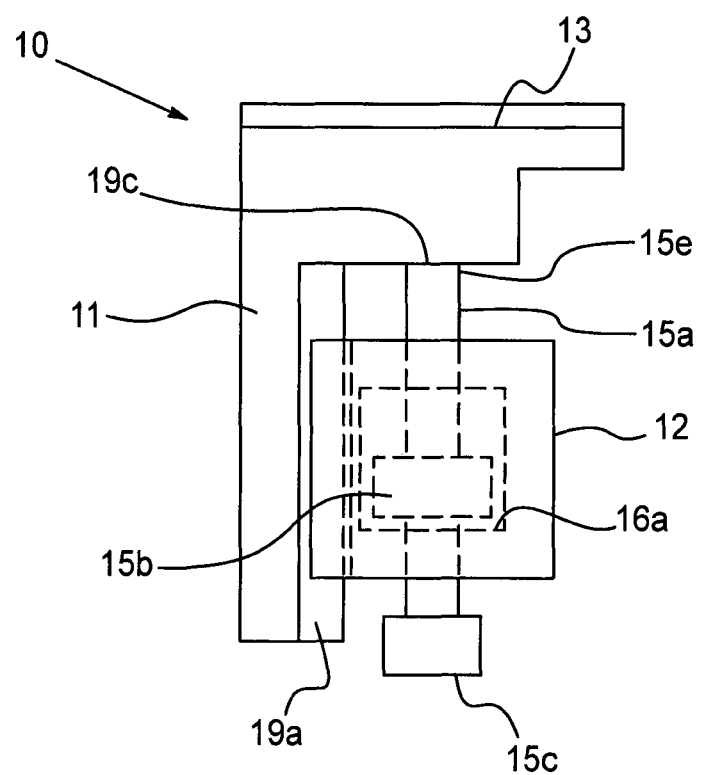
FIG. 7 shows a top view of a further embodiment of a fixing device according to the invention.

FIG. 7 shows a further embodiment of the fixing device 10. In the present embodiment, the lateral opening and the aperture are separated by a wall there between. The cylinder portion 15a is arranged in the aperture. In this embodiment, the second terminal 19c comprises a third abutment structure and the cylinder portion 15a abuts against the third abutment structure of the second terminal 19c of the first portion 11. In some embodiments the second terminal is 19c is provided with a hollow to receive a tip portion 15e of the cylinder portion 15a. The third abutment structure is adapted to receive a force from the cylinder portion in a direction towards the first abutment structure 13 to exert a clamping force in a direction to the first abutment structure 13 and to the first rim 21.

When the threaded abutment structure 15b is released from the second abutment structure 16a, the cylinder portion 15a is withdrawable from the second terminal 19c and releases the first portion 11 from engagement with the second portion 12 and with the first rim 21. In this embodiment, the cylinder portion 15a is held within the aperture and the second portion 12 during the operation lifetime, since the threaded abutment structure 15b is permanently received in the recess 16 and the cylinder portion 15a is permanently threaded through the threaded abutment structure 15b, such that the cylinder portion is not released from the second portion during a multitude of cycles of use. In further embodiments the cylinder portion 15a is threaded into the threaded abutment structure each time the first portion 11 shall be clamped against the first rim 21.

In the depicted embodiment, the first portion provides the retaining web 19a in a cantilever-type configuration, i.e. the retaining web 19a is supported at the first portion 11 at only one end, which is the end closer to the first abutment structure 13. As indicated above, the retaining web 19a extends in parallel to the cylinder portion 15a when the first portion 11 is clamped to the first rim 21. In the depicted embodiment, the retaining web 19a is adapted to be inserted into the lateral opening either in a direction towards the recess 16 or in a direction parallel to the cylinder axis, i.e. the retaining web can be inserted into the lateral opening from the side facing the first rim 21.

In further embodiments, the first portion does not have a retaining web and only serves to clamp an extension of an upper blade half to the first rim 21, particularly in arrangements where the first rim 21 and the first flange 22 form an acute angle such that less retaining force is required.

In the following a method for manufacturing a blade segment 1a using a fixing device 10 according to the depicted embodiments is explained by way of example. The method is applicable by way of modification of existing methods for manufacturing a blade segment.

Initially, the upper mould 20a is arranged with the upper blade half 1a in the hollow facing upwards. For fastening the upper blade half 1a to the upper mould 20a, the extension of the upper blade half 1a is arranged to overly the first rim 21, such that the outermost portion of the extension faces to the first flange 22, where the stationary second portion 12 is attached. The first portion 11 with its first abutment structure 13 is disposed to retain the extension of the upper blade half 1a between the first rim 21 and the first abutment structure 13. The cylinder portion 15a of the clamp drive 15 is shifted through the lateral opening 18 into the aperture 14 such that the threaded abutment structure 15b is received in the recess portion 16.

The driving terminal 15c is rotated such that the threaded abutment structure 15b travels away from the first rim 21 and abuts against the second abutment structure 16a within the recess 16. Thereby, the clamping force F1 is built up and retains the extension of the upper blade half 1a between the first rim 21 and the first abutment structure 13. While the upper blade half 1a is turned around and placed on the lower blade half 1b, the fixing device 10 prevents any displacement of the upper blade half 1a within the upper mould 20a or even that the upper blade half 1a falls out of the upper mould 20a. When the upper mould 20a is above the lower mode 20b, the clamping force F1 provides high friction between the extension of the upper blade half 1a with respect to both, the first rim 21 and the first abutment structure 13. The clamping force F1 from the fixing device 10 thereby counteracts the force of gravity of the upper blade half 1a. In embodiments with the first rim 21 inclined towards the first flange 22, the clamping force F1 also acts on the first portion 11 and presses the first portion 11 against the first flange 22. Then, the weight of the upper blade half 1a is particularly held by the first rim 21. In other embodiments with the first rim 21 perpendicular to the first flange 22, the clamping force F1 holds the extension to the rim 21 and to the first portion 11, which first portion 11 is held against gravity by the retaining web 19a in the lateral opening 18 of the second portion 12. Once the upper blade half 1a is arranged on the lower blade half 1b, the driving terminal 15c of the clamp drive 15 may be rotated in reverse, such that the threaded abutment structure 15b travels back towards the first rim 21 and thereby decreases the clamping force F1. The first portion 11 is then removed.

Particularly in embodiments with the first rim 21 inclined towards the first flange 22, the extension of the upper blade half 1a is pliable, such that the extension can slip from the first and second rims 21, 24 for removal. Once the rotor blade 1 is moulded and removed from the upper and lower moulds 20a, 20b, the extension of the upper blade half 1a is removed from the blade 1.

REFERENCE SIGNS 1 rotor blade
1a upper blade half
1b lower blade half
1c connection surface
1d blade tip
1e blade root
1f leading edge
1g trailing edge 10 fixing device
11 first portion
11a handle attachment
11b handle
12 second portion
12a attachment member
12b spigot
12c receptacle
13 first abutment structure
14 aperture
15 clamping drive
15a cylinder portion
15b threaded abutment structure
15c driving terminal
15d fastening retainer
15e tip portion
16 recess
16a second abutment structure
17 shaft
17a access aperture
17b attachment members
18 lateral opening
19 bracket
19a retaining web
19a' shallow recess
19b first terminal
19c second terminal
19d blind hole
20a upper mould
20b lower mould
21 first rim
22 first flange
23 second flange
24 second rim
100 arrow
200 arrow
F1 clamping force

The invention claimed is:

1. A mould for manufacturing a blade segment of a rotor blade for a wind turbine, the blade segment having a fixating extension, comprising:
a hollow for forming the blade segment;
a rim at an edge of the hollow;
a flange extending perpendicularly from the rim and away from the hollow; and
a fixing device disposed on the flange, the fixing device comprising:
a first portion comprising a first abutment structure to selectively exert a clamping force on the fixating extension of the blade segment; and
a second portion for fixating the fixing device to the mould, wherein the fixing device comprises a clamping force structure and a retaining structure, the clamping force structure comprising:
an aperture and a recess with a second abutment structure within the aperture, the aperture and the recess being arranged in one of the first and second portions;
a clamping drive having a cylinder portion with a threaded structure and a threaded abutment structure encircling the cylinder portion and engaging the threaded structure; and
a third abutment structure arranged in the other one of the first and second portions,
wherein the aperture is adapted to receive the clamping drive cylinder portion such that the cylinder portion protrudes the aperture along its cylinder axis, wherein the second abutment structure is adapted to engage and exert a force on the threaded abutment structure in a direction parallel to the cylinder axis, and wherein the third abutment structure is adapted to receive a force from the clamping drive cylinder portion in a direction towards the first abutment structure to exert the clamping force; and
the retaining structure comprising:
a lateral opening arranged in one of the first and second portions, and
a retaining web arranged on the other one of the first and second portions, the retaining web being adapted for insertion into the lateral opening along an insertion direction, wherein the lateral opening is adapted to lock a movement of the retaining web in a direction perpendicular to the insertion direction and to the direction of the clamping force,
wherein the lateral opening extends from the aperture and allows the clamping drive cylinder portion to shift into the aperture in a direction perpendicular to the cylinder axis, and
wherein the first portion of the fixing device is arranged to selectively apply a clamping force against the rim thereby clamping the fixating extension between the first portion and the rim.

2. The mould according to claim 1, wherein the retaining web extends in parallel to the cylinder axis.

3. The mould according to claim 1, wherein the first and third abutment structures are aligned to the cylinder axis of the clamping drive cylinder portion.

4. The mould according to claim 3, wherein the one of the first and second portions comprising the clamping drive cylinder portion further comprises a bracket having first and second terminals with the first and second terminals comprising the third abutment structure, the bracket holding the clamping drive cylinder portion between the first and the second terminals, such that the first and the second terminals are aligned to the cylinder axis, and connecting the clamping drive cylinder portion to the one of the first and second portions.

5. The mould according to claim 4, wherein the retaining web extends between the first and second terminals, the retaining web being rigidly connected to the bracket and to the one of the first and second portions.

6. The mould according to claim 4, wherein the clamping drive cylinder portion comprises a driving terminal, the driving terminal protruding one of the first and second terminals to rotationally adjust the cylinder portion.

7. The mould according to claim 1, wherein the first portion comprises a handle attachment.

8. The mould according to claim 1, wherein the clamping drive cylinder portion is received permanently in one of the first and second portions.

9. A method for manufacturing a rotor blade for a wind turbine in the mould according to claim 1, the rotor blade being comprised of first and second blade segments having a fixating extension, the method comprising
providing the first blade segment in the hollow of the mould, such that the hollow faces upwards and the fixating portion overlies the rim,
providing the first portion of the fixing device and clamping the fixating extension between the first portion and the rim of the mould;
providing the second blade segment in the hollow of a further mould such that the hollow faces upwards;

turning the mould such that the hollow with the first blade segment faces the second blade segment in the hollow of the further mould;

arranging the first blade segment on the second blade segment; and unclamping the fixating extension between the first portion and the rim.

10. The method according to claim 9, wherein clamping the fixating extension between the first portion and the rim comprises exerting a clamping force on the fixating extension towards the rim via the first abutment structure of the first portion.

11. The method according to claim 10, wherein the clamping force is generated by rotating the cylinder portion such that the threaded abutment structure travels away from the rim and abuts against the second abutment structure within the recess.

12. The method according to claim 9, wherein providing the first portion of the fixing device comprises shifting the cylinder portion through the lateral opening into the aperture in a direction perpendicular to the cylinder axis, such that the threaded abutment structure is received in the recess portion.

13. The mould according to claim 1, wherein the clamping drive comprises a driving terminal for rotating the cylinder portion, the driving terminal having engagement structure configured to receiving a device that drives the cylinder portion rotationally in order to shift or force the threaded abutment structure along the cylinder portion and thus to generate a clamping force.

14. The mould according to claim 1, wherein the retaining web extends between first and second terminals of a bracket and in parallel to the cylinder portion of the clamp drive, the retaining web thereby being configured to take up bending moments caused by forces in the direction transversal to the clamping force such that the clamp drive and its cylinder portion do not have to take up such forces.

15. The method according to claim 9, wherein the threaded abutment structure is moved along the cylinder portion of the clamp drive by means of the rotation of a rotational drive or tool received in a driving terminal of the clamp drive.

16. A fixing device for fixating a blade segment of a rotor blade of a wind turbine to a mould in which the blade segment is manufactured, wherein the blade segment has a fixating extension, the fixing device comprising:

a first portion comprising a first abutment structure to selectively exert a clamping force on the fixating extension of the blade segment; and a second portion for fixating the fixing device to the mould, wherein the fixing device comprises a clamping force structure and a retaining structure, the clamping force structure comprising:

an aperture and a recess with a second abutment structure within the aperture, the aperture and the recess being arranged in one of the first and second portions;

a clamping drive having a cylinder portion with a threaded structure and a threaded abutment structure encircling the cylinder portion and engaging the threaded structure; and a third abutment structure arranged in the other one of the first and second portions, wherein the aperture is adapted to receive the clamping drive cylinder portion such that the cylinder portion protrudes the aperture along its cylinder axis, wherein the second abutment structure is adapted to engage and exert a force on the threaded abutment structure in a direction parallel to the cylinder axis, and wherein the third abutment structure is adapted to receive a force from the clamping drive cylinder portion in a direction towards the first abutment structure to exert the clamping force; and the retaining structure comprising:

a lateral opening arranged in one of the first and second portions, and a retaining web arranged on the other one of the first and second portions, the retaining web being adapted for insertion into the lateral opening along an insertion direction, wherein the lateral opening is adapted to lock a movement of the retaining web in a direction perpendicular to the insertion direction and to the direction of the clamping force, wherein the lateral opening extends from the aperture and allows the clamping drive cylinder portion to shift into the aperture in a direction perpendicular to the cylinder axis, wherein the first and third abutment structures are aligned to the cylinder axis of the clamping drive cylinder portion, wherein the one of the first and second portions comprising the clamping drive cylinder portion further comprises a bracket having first and second terminals with the first and second terminals comprising the third abutment structure, the bracket holding the clamping drive cylinder portion between the first and the second terminals, such that the first and the second terminals are aligned to the cylinder axis, and connecting the clamping drive cylinder portion to the one of the first and second portions, and wherein the retaining web extends between the first and second terminals, the retaining web being rigidly connected to the bracket and to the one of the first and second portions.

* * * * *